US008861864B2

(12) United States Patent
Hong et al.

(10) Patent No.: US 8,861,864 B2
(45) Date of Patent: Oct. 14, 2014

(54) IMAGE FEATURE DETECTION BASED ON APPLICATION OF MULTIPLE FEATURE DETECTORS

(75) Inventors: John Hong, San Diego, CA (US); Onur C. Hamsici, San Diego, CA (US); Jose R. dos Santos, San Diego, CA (US); Joseph Huang, San Diego, CA (US); Chong U. Lee, San Diego, CA (US); Yuriy Reznik, Seattle, WA (US); Mark K. Murphy, Hillsboro, OR (US); Devender A. Yamakawa, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 304 days.

(21) Appl. No.: 12/855,502

(22) Filed: Aug. 12, 2010

(65) Prior Publication Data

US 2011/0222774 A1 Sep. 15, 2011

Related U.S. Application Data

(60) Provisional application No. 61/312,853, filed on Mar. 11, 2010.

(51) Int. Cl.
*G06K 9/46* (2006.01)

(52) U.S. Cl.
CPC .................................. *G06K 9/4671* (2013.01)
USPC ............ 382/190; 382/224; 382/154; 382/218

(58) Field of Classification Search
CPC .................. G06T 2207/10016; G06T 7/0083; G06T 7/0081; G06T 7/0075; G06K 9/48; G06K 9/4609; G06K 9/00664; G06K 9/6202
USPC .................................. 382/190, 224, 154, 218
See application file for complete search history.

(56) References Cited

U.S. PATENT DOCUMENTS

| 2002/0191861 A1 | 12/2002 | Cheatle |
| 2003/0025812 A1 | 2/2003 | Slatter |

(Continued)

FOREIGN PATENT DOCUMENTS

| JP | 2003506800 A | 2/2003 |
| JP | 2004274508 A | 9/2004 |

(Continued)

OTHER PUBLICATIONS

Daniel Wagner et al., "Multiple target detection and tracking with guaranteed frame rates on mobile phones", Mixed and Augmented Reality, 2009, ISMAR 2009, 8th IEEE International Symposium on, IEEE, Piscataway, NJ, USA, Oct. 19, 2009, pp. 57-64, XP031568944, ISBN: 978-1-4244-5390-0.

(Continued)

*Primary Examiner* — Ruiping Li
(74) *Attorney, Agent, or Firm* — Espartaco Diaz Hidalgo; James R. Gambale, Jr.

(57) ABSTRACT

In a particular embodiment, a method includes applying a first feature detector to a portion of an image to detect a first set of features. The first set of features is used to locate a region of interest, and a boundary corresponding to the region of interest is determined. The method also includes displaying the boundary at a display. In response to receiving user input to accept the displayed boundary, a second feature detector is applied to an area of the image encapsulated by the boundary.

29 Claims, 9 Drawing Sheets

(56) References Cited

U.S. PATENT DOCUMENTS

| | | |
|---|---|---|
| 2006/0045381 A1 | 3/2006 | Matsuo et al. |
| 2006/0253491 A1 | 11/2006 | Gokturk et al. |
| 2006/0280364 A1 | 12/2006 | Ma et al. |
| 2007/0050411 A1 | 3/2007 | Hull et al. |

FOREIGN PATENT DOCUMENTS

| | | |
|---|---|---|
| JP | 2005309746 A | 11/2005 |
| JP | 2006216046 A | 8/2006 |
| JP | 2006276948 A | 10/2006 |
| JP | 2009071732 A | 4/2009 |
| JP | 2009268005 A | 11/2009 |
| WO | 0111553 A1 | 2/2001 |
| WO | 2008138409 A1 | 11/2008 |

OTHER PUBLICATIONS

David Gavilan et al., "Color Blobs-Based Image Retrieval in Broad Domains", IEIC Technical Report (Institute of Electronics, Information and Communication Engineers), vol. 104, No. 544, Jan. 1, 2005, pp. 43-48, XP55004962.

Duy-Nguyen TA et al., "SurfTrac: Efficient tracking and continuous object recognition using local feature descriptors", Computer Vision and Pattern Recognition, 2009, CVPR 2009, IEEE Conference on, IEEE, Piscataway, NJ, USA, Jun. 20, 2009, pp. 2937-2944, XP031607358, ISBN: 978-1-4244-3992-8.

International Search Report and Written Opinion—PCT/US2011/028232, ISA/EPO—Aug. 29, 2011.

Sundeep Vaddadi et al., "Keypoint Clustering for Robust Image Matching", Proceedings of SPIE 7798, Aug. 2, 2010, p. 77980K, XP55005011, ISSN: 0277-786X, DOI: 10.1117/12.862359.

Vu K et al., "Image Retrieval Based on Regions of Interest", IEEE Transactions on Knowledge and data engineering, IEEE Service Center, Los Alamitos, CA, US, vol. 15, No. 4, Jul. 1, 2003, pp. 1045-1049, XP002569239, ISSN: 1041-4347, DOI: 10.1109/TKDE.2003.1209021.

Liu, Qiong et al. "Embedded Media Markers: Mark on Paper that Signify Associated Media," CHI 2009, Apr. 4-9, 2009, Boston, MA, US, 10 pages.

E. Rosten: and T. Drummond, "Fusing points and lines for high performance tracking," Proc. 10th int'l Conf. on Computer Vision, Beijing, vol. 2, pp. 1508-1515, 2005.

D. G. Lowe, "Distinctive image features from scale-invariant keypoints," International Journal of Computer Vision, vol. 60, pp. 91-110, 2004.

H. Bay, T. Tuytelaars, and L. Van Gool, "Surf: Speeded-up robust features," in 9th European Conference on Computer Vision.

V. Lepelit and P. Fua, "Keypoinit recognition using randomized trees," Transactions on Pattern Analysis and Machine intelligence, vol. 28, No. 9, pp. 1465-1479,2006.

D, Comaniciu and P, Meer, "Mean shift: A robust approach toward feature space analysis," IEEE Transactions on Pattern Analysis and Machine Intelligence, vol. 24, No. 5, pp. 603-619, 2002.

"Video Segmentation and Tracking Algorithms Based Traffic Flow Analysis," Xiao-Yu, Ma, Master's Thesis of Zhejiang University, pp. 43-45 and 49-56.

When multiple regions of potential interest are detected (e.g., nearly equidistant from center), the region with most keypoints is selected for the boundary

IMAGE FEATURE DETECTION BASED ON APPLICATION OF MULTIPLE FEATURE DETECTORS

CLAIM OF PRIORITY UNDER 35 U.S.C. §119

The present application for patent claims priority to Provisional Application No. 61/312,853 entitled "IMAGE FEATURE DETECTION BASED ON APPLICATION OF MULTIPLE FEATURE DETECTORS" filed Mar. 11, 2010, and assigned to the assignee hereof.

FIELD

The present disclosure is generally related to image processing.

DESCRIPTION OF RELATED ART

Advances in technology have resulted in smaller and more powerful computing devices. For example, there currently exist a variety of portable personal computing devices, including wireless computing devices, such as portable wireless telephones, personal digital assistants (PDAs), and paging devices that are small, lightweight, and easily carried by users. More specifically, portable wireless telephones, such as cellular telephones can communicate voice and data packets over wireless networks. Further, many such wireless telephones include other types of devices that are incorporated therein. For example, a wireless telephone can also include a digital still camera, a digital video camera, a digital recorder, and an audio file player. Also, such wireless telephones can process executable instructions, including software applications, such as a web browser application, that can be used to access the Internet. As such, these wireless telephones can include significant computing capabilities.

Computer vision algorithms are often used to "recognize" objects in images captured by digital cameras. However, many computer vision algorithms are complex and resource intensive, rendering them ill-suited for adaptation into mobile devices such as wireless telephones. Furthermore, computer vision algorithms are generally limited by the quality and composition of the image to be processed and the algorithm may incorrectly recognize objects due to factors such as noise and object clutter.

I. SUMMARY

When a typical video graphics array (VGA) image including several objects and clutter is subjected to advanced image feature detectors such as Scale-Invariant Feature Transform (SIFT), the feature detector may detect thousands of keypoints. Object recognition based on the results of such feature detection may be a slow and time-consuming process. The image feature detection methods disclosed herein apply a computationally inexpensive image feature detector, such as Features from Accelerated Segment Test (FAST), to all or part of an image to segment the image into one or more regions of interest. After a user selects a desired region of interest, a more accurate feature detector, such as SIFT, is applied to the region of interest.

In a particular embodiment, a method is disclosed that includes applying a first feature detector to a portion of an image captured by a camera to detect a first set of features. The method also includes locating a region of interest based on the first set of features and determining a boundary corresponding to the region of interest. The method further includes displaying the boundary at a display. The method includes, in response to receiving user input to accept the displayed boundary, applying a second feature detector to an area of the image encapsulated by the boundary.

In another particular embodiment, a mobile device is disclosed. The mobile device includes a camera, a display, and a user input device (e.g., a touchscreen or a keypad). The mobile device also includes a processor configured to apply a first feature detector to a portion of the image to detect a first set of features. The processor is also configured to locate a region of interest based on the first set of features and to determine a boundary that corresponds to the region of interest. The processor is further configured to detect user input via the user input device to indicate the user's acceptance of the boundary. The processor is configured to apply a second feature detector to an area of the image encapsulated by the boundary.

One particular advantage provided by at least one of the disclosed embodiments is an improved object recognition method that provides high accuracy at increased speed and with reduced computational complexity. Another particular advantage provided by at least one of the disclosed embodiments is an ability to perform object segmentation with respect to a captured image at a mobile device that does not include a touchscreen.

Other aspects, advantages, and features of the present disclosure will become apparent after review of the entire application, including the following sections: Brief Description of the Drawings, Detailed Description, and the Claims.

II. BRIEF DESCRIPTION OF THE DRAWINGS

III. DETAILED DESCRIPTION

Figure 1:
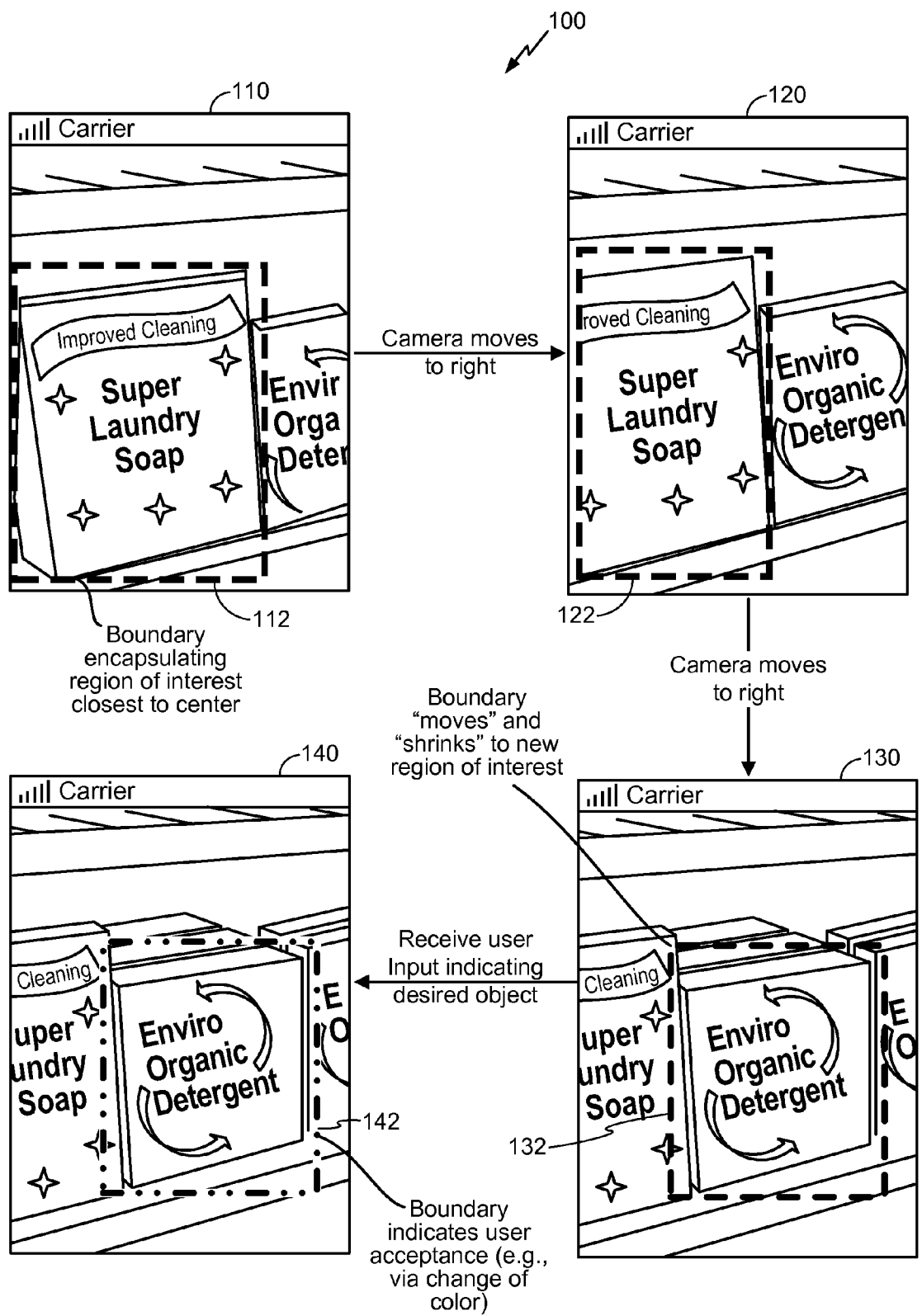
FIG. 1 is a diagram illustrating use of a particular illustrative embodiment of a method of image feature detection, including automatic boundary determination.

While computer vision algorithms can detect features within an image, the most accurate computer vision algorithms are typically the most resource intensive and computationally complex. For example, algorithms that perform feature detection based on keypoint localization, such as Scale-Invariant Feature Transform (SIFT) and Speeded Up Robust Features (SURF) provide accurate localization of keypoints, based on computationally complex Gaussian scale space and approximate Haar wavelet calculations, respectively. Computationally inexpensive (e.g., more efficiently computable) image feature detectors, such as Features from Accelerated Segment Test (FAST), may provide faster but less accurate keypoint detection. Neither SIFT nor SURF-type feature detectors may be well-suited for use at devices having limited resources, such as mobile phones. For example, implementing complex algorithms, such as SIFT and SURF, at a mobile phone may result in slow response times and a sluggish user experience. On the other hand, using a faster but less accurate algorithm, such as FAST, may result in an unacceptable number of false identifications and false positives (e.g., incorrectly recognizing background noise as an object).

The image feature detection methods disclosed herein may provide the accuracy of computationally complex algorithms such as SIFT at a reduced computational cost. For example, a particular image to be processed may include a user's desired object of interest and may also include adjacent/surrounding objects that are not of interest. Performing SIFT-based keypoint location on image portions that represent objects that are not of interest may waste computational resources. Thus, it may be beneficial to locate and isolate the object of interest from other portions of the image prior to performing the SIFT algorithm. For example, it may be beneficial to determine a boundary surrounding the object of interest and perform the SIFT algorithm with respect to just the area of the image that is encapsulated by the boundary.

On devices that include a touchscreen, a user may manually "draw" a boundary around an object of interest. However, not all devices have touchscreens. Furthermore, an ability to automatically determine a boundary at a touchscreen device without requiring a user to manually draw the boundary may result in a more streamlined user experience. For example, a user may be able to identify objects in a "point-and-click" manner.

The image feature detection methods disclosed herein may utilize FAST-type feature detection until a boundary is determined and then perform SIFT-type feature detection to "recognize" an object of interest within the boundary. Thus, image feature detection may include three steps: locating a region of interest in an image based on FAST-type feature detection, determining a boundary corresponding to the region of interest, and performing SIFT-type feature detection in an area of the image encapsulated by the boundary. FAST-type feature detection is well-suited for use as a preprocessing algorithm for SIFT-type feature detection because both FAST-type and SIFT-type feature detectors are blob-based feature detectors that have similar discriminating behavior. Moreover, although FAST keypoints may not correspond exactly to SIFT keypoints, corresponding sets of FAST keypoints and SIFT keypoints may generally appear as overlapping clusters. Thus, a rapidly determined clustered distribution of FAST keypoints (e.g., at the corners of a desired object) may be used to locate a region of interest in an image that is subsequently processed using a more accurate SIFT-type feature detector.

Referring to FIG. 1, use of a particular illustrative embodiment of a method of image feature detection, including automatic boundary determination, is disclosed and generally designated 100. In the particular embodiment illustrated in FIG. 1, the method is illustrated based on exemplary captured images 110, 120, 130, 140 from a mobile phone camera application. The images 110, 120, 130, and 140 may be video frames captured by the mobile phone camera application (e.g., while a user "points" the mobile phone's camera at the boxes of detergent). However, it should be noted that image feature detection as disclosed herein is not limited to mobile phones having an image capture device (e.g., a camera) and a display. Image feature detection as disclosed herein may be performed by any electronic imaging device.

The first image 110 includes two boxes of detergent. When a FAST-type feature detector is applied to the first image 110 (e.g., a portion of the first image 110 or the entire first image 110), the resulting FAST keypoints may be clustered so as to indicate that each of the two boxes of detergent is a candidate region of interest. In a particular embodiment, when multiple candidate regions of interest are detected, the region of interest closest to the center of the image is chosen. For example, in the particular embodiment illustrated in FIG. 1, the box of detergent on the left may be closest to the center of the first image 110. A boundary 112 corresponding to the region of interest may be determined and displayed. It should be noted that although the boundary 112 is depicted as a bounding box, the boundary may alternately be a bounding ellipse, a bounding circle, or other bounding shape.

As the user moves the camera, the boundary may change shape. For example, the user may move the camera to the right, translating the first image 110 into the second image 120. The boundary 112 may change shape in response to the movement, as illustrated by a modified boundary 122. The modified boundary may encapsulate the same object of interest as a previous boundary or may encapsulate a different object of interest. Thus, a boundary around a region of interest may appear to the user to be changing shape or moving with the object in real-time or near real-time with respect to camera movements made by the user.

As the camera moves, a formerly identified region of interest may no longer be a most likely region of interest. For example, a different candidate region of interest may be closest to the center of the image, may include more keypoints, or may have a higher keypoint density than the formerly identified region of interest. When a new region of interest is selected, the boundary may be adjusted to circumscribe the new region of interest. For example, in the third image 130, the box of detergent on the right may be identified as a new region of interest and a new boundary 132 may be determined and displayed.

Thus, a user may move a camera up, down, left, right, towards, or away from a desired object of interest until the desired object of interest is surrounded by an automatically determined boundary. When the desired object of interest is surrounded by a displayed boundary, the user may provide input to accept the displayed boundary. In a particular embodiment, the displayed boundary may change color or shading to indicate user acceptance, as illustrated by an accepted boundary 142 in the fourth image 140. In response to the user input accepting the displayed boundary, a SIFT-type feature detector may be applied to the area of the image encapsulated by the displayed boundary. For example, application of the SIFT-type feature detector may provide results that can be used to perform product identification (e.g., identify a detergent manufacturer) or information retrieval (e.g., find prices for the same box of detergent from online vendors). In a particular embodiment, the results of the SIFT-type feature detector are compared to sets of keypoints stored at an object recognition knowledgebase (e.g., a database).

It will be appreciated that the image feature detection method of FIG. 1 may provide object recognition capabilities based on application of multiple types of feature detectors. Thus, the method of FIG. 1 may combine accuracy benefits associated with SIFT-type feature detection with speed benefits of FAST-type feature detection. It will also be appreciated that the method of FIG. 1 may operate without examination of any color data in an image, which may lead to increased processing speed.

Figure 2:
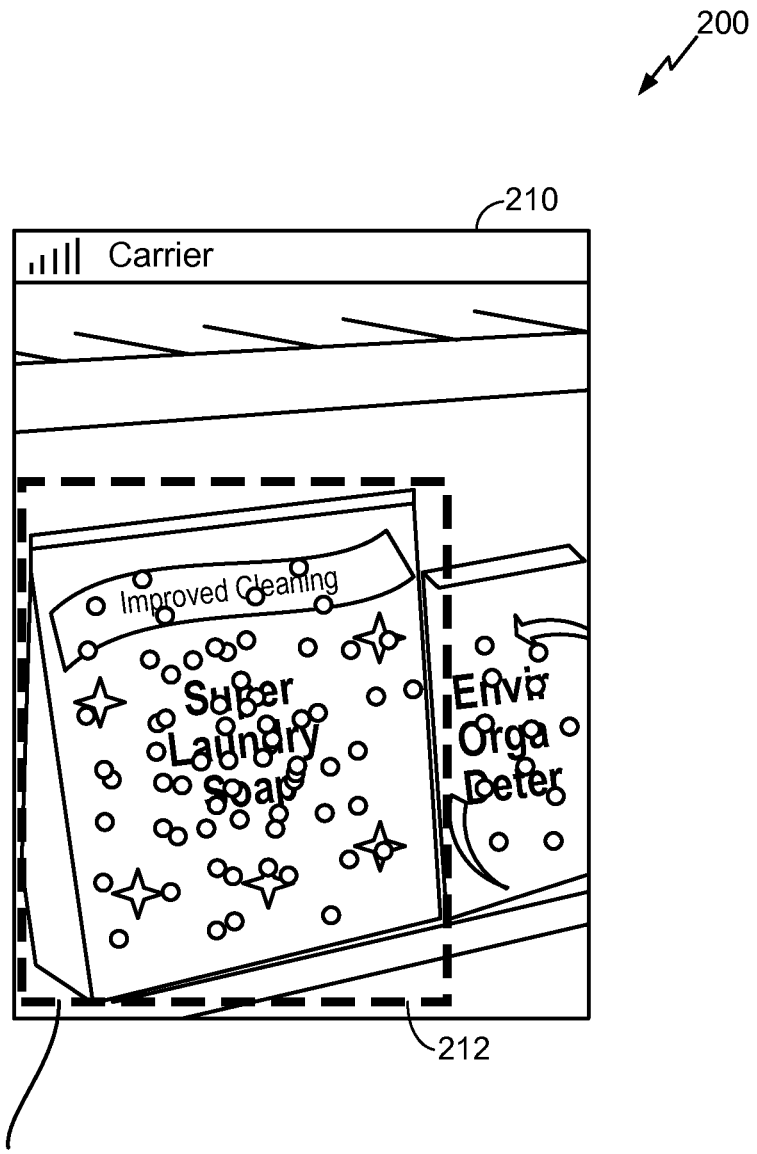
FIG. 2 is a diagram illustrating use of another particular illustrative embodiment of a method of image feature detection, including distinguishing between multiple objects.

Referring to FIG. 2, use of a particular illustrative embodiment of a method of image feature detection, including distinguishing between multiple objects, is depicted and generally designated 200.

In a particular embodiment, two candidate regions of interest may be equidistant or nearly equidistant from a center of an image. For example, in FIG. 2, two regions of interest (e.g., one region of interest for each of the two detergent boxes) may be nearly equidistant from a center of an image 210. When there are multiple candidate regions of interest, the candidate having the highest number of located keypoints (e.g., FAST keypoints), may be selected. For example, in FIG. 2, a region of interest that includes the detergent box on the left may include more FAST keypoints (e.g., 50 keypoints) than a region of interest that includes the detergent box on the right (e.g., 20 keypoints). Thus, the region of interest that includes the detergent box on the left may be selected and a boundary 212 corresponding to the selected region of interest may be determined and displayed. In cases where two candidate regions of interest compete for a boundary, the process can be stabilized by implementing a momentum term with respect to a selected region of interest. The momentum term may be a bias or a multiplier applied to an actual number of features in the selected region. Adding a momentum term may result in the user having to slightly exaggerate a motion to point the camera towards the other candidate region of interest before the movement of the boundary is affected.

Alternatively, when there are multiple candidates of interest near the image center, the candidate having the highest density of FAST keypoints may be selected. Also, in a particular embodiment, candidate regions having a density of FAST keypoints less than an object indication threshold (e.g., 1 keypoint per 100 square pixels) may be ignored. Thus, the selected region of interest may be the region closest to the image center having a density of FAST keypoints exceeding the object indication threshold.

Figure 3:
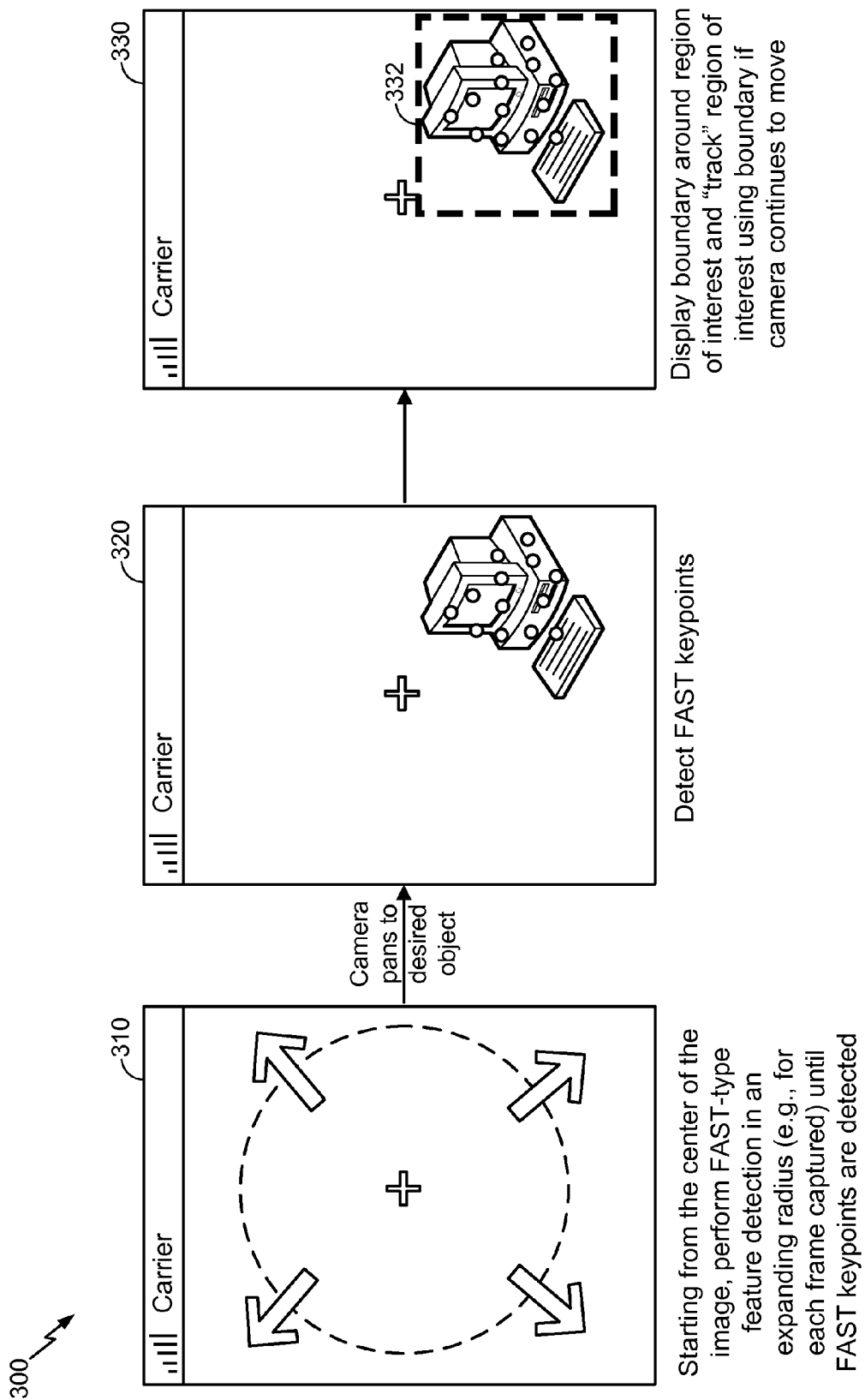
FIG. 3 is a diagram illustrating use of another particular illustrative embodiment of a method of image feature detection, including identification and tracking of keypoints.

Referring to FIG. 3, application of a particular illustrative embodiment of a method of image feature detection, including identification and tracking of keypoints, is depicted and generally designated 300.

In a particular embodiment, FAST-type feature detection is performed on each image (e.g., frame) captured by a camera in an expanding radius starting from a center of the image, as illustrated by a first image 310. When no FAST keypoints can be detected (e.g., the camera is pointed at a blank sheet of paper or a wall), no region of interest may be located and no boundary may be displayed.

When the camera moves and an object enters the image, as illustrated by a second image 320, FAST keypoints may be detected. A region of interest that includes the object may be located and a boundary corresponding to the located region of interest may be determined and displayed, as indicated by a boundary 332 at a third image 330. The boundary 332 may "track" the region of interest if the camera continues to move.

Figure 4:
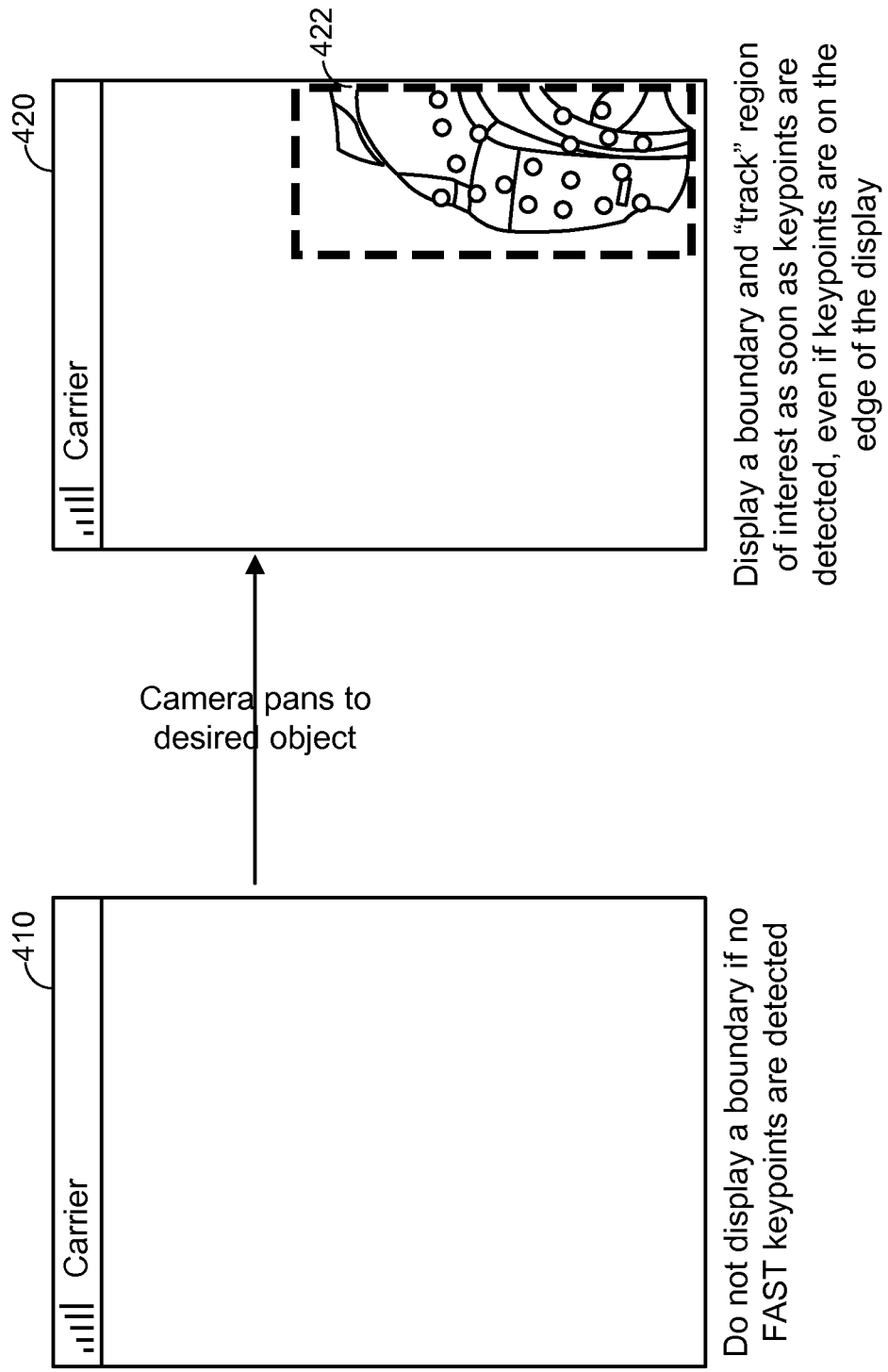
FIG. 4 is a diagram illustrating use of another particular illustrative embodiment of a method of image feature detection, including identification and tracking of keypoints.

It should be noted that although FAST keypoints may be detected in an expanding radius starting from an image center, a region of interest for an object may be determined as soon as the object enters the camera picture. That is, the region of interest may initially be identified at the edge of the image. For example, referring to FIG. 4, no boundary may be displayed at a first image 410 if no FAST keypoints are detected.

As soon as an object (e.g., car) enters an edge of the image, a boundary 422 may be determined and displayed as indicated at a second image 420.

Figure 5:
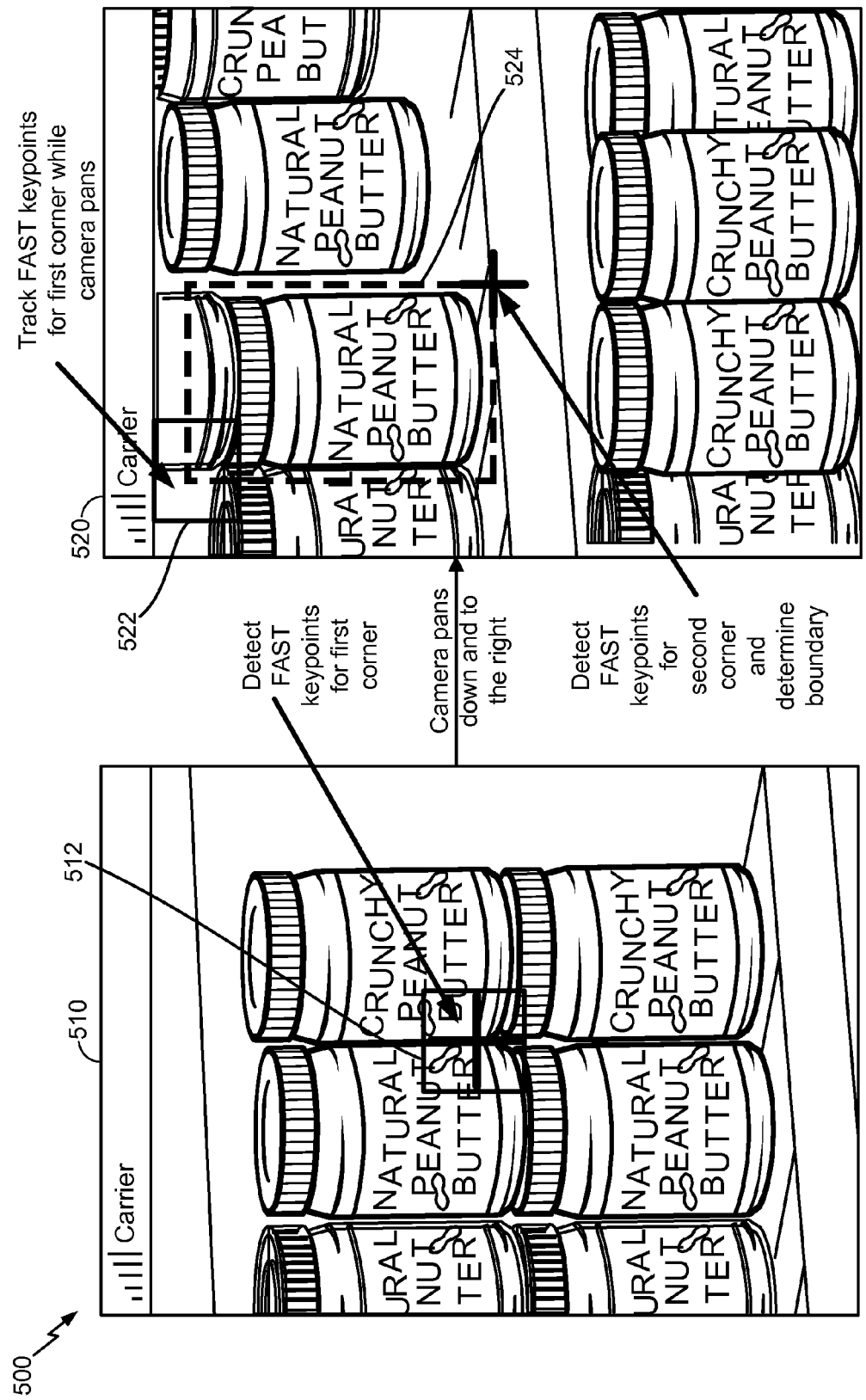
FIG. 5 is a diagram illustrating use of another particular illustrative embodiment of a method of image feature detection, including user-assisted boundary determination.

Referring to FIG. 5, application of a particular illustrative embodiment of a method of image feature detection, including user-assisted boundary determination, is depicted and generally designated 500.

Image feature detection may include user-assisted boundary determination instead of automatic boundary determination. For example, a user may desire object recognition with respect to the lower right-hand jar of peanut butter in a first image 510. In a particular embodiment, the user may initialize boundary determination by moving the camera such that a center cursor at the first image 510 is located at a first corner of the lower right-hand jar of peanut butter. In response to a user input (e.g., a button push), FAST-type feature detection may be applied to a patch 512 of the first image 510 surrounding the center cursor. The FAST-type feature detector may detect a first set of FAST keypoints.

The locations of the first set of FAST keypoints may be stored, so that the first corner of the right-hand jar of peanut butter is "tracked" while the user pans the camera down and to the right, translating the first image 510 into a second image 520. The patch 512 of the first image 510 may thus be tracked to a patch 522 of the second image 520. The user may position the camera such that the center cursor is located at a second corner of the lower-right hand jar of peanut butter that is opposite the first corner. In response to another user input (e.g., another button push), FAST-type feature detection may be applied to the second corner to detect a second set of FAST keypoints. A boundary 524 may then be determined based on the first set and the second set of FAST keypoints.

It will thus be appreciated that the method of FIG. 5 may determine a region of interest with greater speed based on user input (e.g., corner identification), thereby reducing an overall time to identify an object based on combined FAST-type and SIFT-type feature detection.

Figure 6:
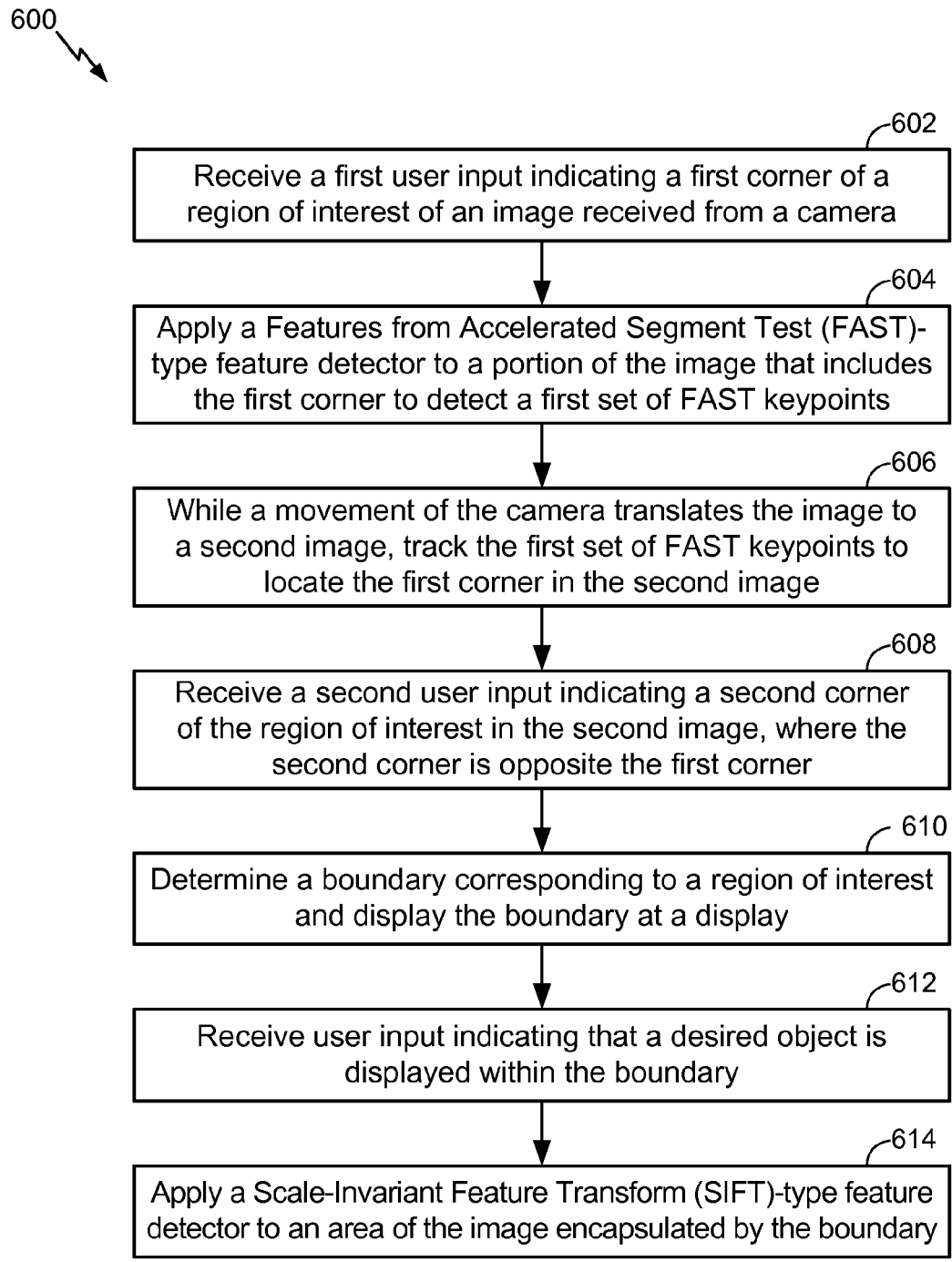
FIG. 6 is a flow chart of a particular illustrative embodiment of a method of image feature determination based on application of multiple feature detectors.

Referring to FIG. 6, a flow diagram of a particular illustrative embodiment of a method of image feature determination based on application of multiple feature detectors is depicted and generally designated 600. In an illustrative embodiment, the method 600 may be performed by a mobile device 800 of FIG. 8.

The method 600 includes receiving a first user input indicating a first corner of a region of interest of an image received from a camera, at 602. The method 600 also includes applying a FAST-type feature detector to a portion of the image that includes the first corner to detect a first set of FAST keypoints, at 604. For example, as shown in FIG. 5, the camera may be held by a user such that the center cursor of the first image 510 is at the upper left-hand corner of the desired jar of peanut butter, and a FAST-type feature detector may be applied to the patch 512 to detect a first set of FAST keypoints.

The method 600 further includes, while a movement of the camera translates the first image into a second image, tracking the first set of FAST keypoints to locate the first corner in the second image, at 606. For example, in FIG. 5, the first set of FAST keypoints may be tracked so that the patch 512 may be located in the second image as the patch 522. The method 600 includes receiving a second user input indicating a second corner of the region of interest in the second image, at 608. The second corner is opposite the first corner. For example, in FIG. 5, the camera may move such that the center cursor of the second image 520 is at the lower right-hand corner of the desired jar of peanut butter.

The method 600 further includes locating a region of interest based on the first set of FAST keypoints and the user-provided second boundary corner (diagonally opposite to the first set of FAST keypoints) and determining and displaying a boundary corresponding to the region of interest, at 610. For example, referring to FIG. 5, the boundary 524 may be displayed around the desired jar of peanut butter.

The method 600 includes receiving user input indicating that a desired object is displayed within the boundary, at 612, and applying a SIFT-type feature detector to an area of the image encapsulated by the boundary, at 614. For example, in FIG. 5, a SIFT-type feature detector may be applied to the area of the second image 520 that is encapsulated by the boundary 524.

Figure 7:
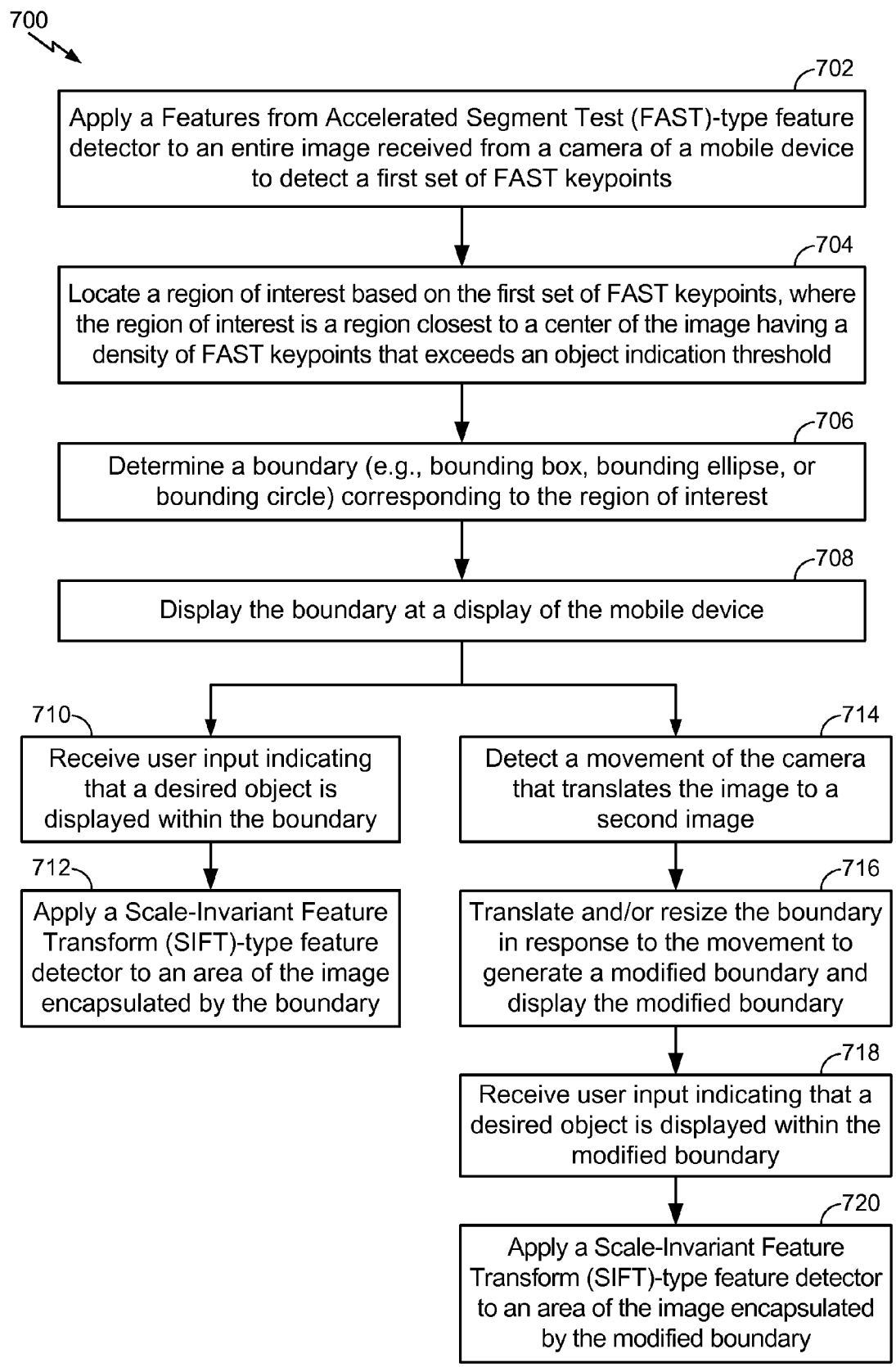
FIG. 7 is a flow chart of another particular illustrative embodiment of a method of image feature determination based on application of multiple feature detectors.

Referring to FIG. 7, a flow diagram of another particular illustrative embodiment of a method of image feature determination based on application of different types of feature detectors is depicted and generally designated 700. In an illustrative embodiment, the method 700 may be performed by the mobile device 800 of FIG. 8.

The method 700 includes applying a FAST-type feature detector to an entire image captured by a camera of a mobile device to detect a first set of FAST keypoints, at 702. For example, in FIG. 1, a FAST-type feature detector may be applied to the first image 110 of FIG. 1 to detect a first set of FAST keypoints.

The method 700 also includes locating a region of interest based on the first set of FAST keypoints, at 704. The region of interest is a region closest to a center of the image having a density of FAST keypoints that exceeds an object indication threshold. For example, in FIG. 1, the region interest including the box of detergent on the left may be selected.

The method 700 further includes determining a boundary (e.g., a bounding box, a bounding ellipse, or a bounding circle) corresponding to the region of interest, at 706, and displaying the boundary at a display of the mobile device, at 708. For example, in FIG. 1, a region of interest that includes the box of detergent on the left may be located at the first image 110, and the boundary 112 may be displayed.

The method 700 includes receiving user input indicating that a desired object is displayed within the boundary, at 710, and applying a SIFT-type feature detector to an area of the image encapsulated by the boundary, at 712. For example, in FIG. 1, the user may accept the boundary 112, and a SIFT-type feature detector may be applied to an area of the first image 110 encapsulated by the boundary 112.

Alternately, the method 700 includes detecting a movement of the camera that translates the image to a second image, at 714. For example, in FIG. 1, the first image 110 may be translated to the second image 120. The method 700 also includes translating and/or resizing the boundary in response to the movement to generate a modified boundary and displaying the modified boundary, at 716. For example, in FIG. 1, the boundary 112 may be translated and resized into the modified boundary 122. The method 700 further includes receiving user input indicating that a desired object is displayed within the modified boundary, at 718, and applying the SIFT-type feature detector to an area of the image encapsulated by the modified boundary, at 720. For example, in FIG. 1, the user may accept the modified boundary 122, and a SIFT-type feature detector may be applied to an area of the second image 120 encapsulated by the modified boundary 122.

In a particular illustrative embodiment, image features may be located and regions of interest may be determined based on the following algorithm and pseudocode.

In a first step of the algorithm, keypoints may be located within an image. For example, a FAST-type feature detector (e.g., corner detector) may be used to detect keypoints in the image. In a particular embodiment, detecting keypoints includes comparing each pixel of the image with its neighbors at a certain distance r. This may be done sequentially for each orientation, such that a gray level value (I(c)) at a center pixel c is compared with two of its diametrically opposed pixel neighbors, $I(c+r_\theta)$ and $I(c-r_\theta)$. Here, $r_\theta = (r \cos\theta, r \sin\theta)^T$ and $0 \leq \theta \leq \pi$. The keypoint's candidate center pixel c is eliminated if equation (1) is satisfied for some $\theta$ and threshold $\tau$:

$$|I(c)-I(c+r_\theta)| \leq \tau \text{ AND } |I(c)-I(c-r_\theta)| \leq \tau \tag{1}$$

It should be noted that the center pixel may satisfy equation (1) for all possible $\theta$ in the neighborhood of corner or blob-like portions. However, pixels neighboring edges or near-uniform spaces (e.g., walls) may be eliminated in a few iterations. After all of the pixels in the image are scanned, pixel locations satisfying equation (1) may be kept as keypoint locations.

In a second step of the algorithm, a local maximum (e.g., most dense keypoint region closest to a specified center of attention) may be detected from amongst the keypoint locations, which represent centers of corners or blob-like image regions. First, a nonparametric density function for the distribution of the keypoints may be estimated. Next, a mean-shift algorithm may be used to locate a local maxima of the density.

If the set of keypoint locations are represented as a set $X = \{x_1, x_2, \ldots, x_n\}$ where $x_i = (x, y)^T$ in $R^2$ (the two-dimensional coordinate space) is the two-dimensional coordinates of keypoint i. The nonparametric kernel density estimator for this set may be defined by equation (2), where $k_h(x, x_i)$ is a kernel with bandwidth h.

$$k(x) = \frac{1}{n} \sum_{i=1}^{n} k_h(x, x_i) \tag{2}$$

The bandwidth may specify the resolution of the density and thus the neighborhood of points affecting the local density estimate around x. For example, for a Gaussian kernel, the bandwidth h may correspond to the standard deviation, i.e., $k_h(x,x_i) = c_h g_h(x,x_i) = c_h \exp\{-\|x-x_i\|^2/2h^2\}$, where $c_h$ is the normalizing constant and $g_h(\ldots, \ldots)$ is the unnormalized Gaussian kernel.

If the kernel is convex and monotonically decreasing, the mean-shift algorithm will converge to a local maxima. This may be done iteratively following the mean-shift, which is proportional to the gradient ascent direction of the density function. For a Gaussian kernel, the mean shift is given by equation (3), where $y_{j+1}$ is the shifted location from $y_j$ under the estimated density function:

$$y_{j+1} = \frac{\sum_{i=1}^{n} x_i g_h(y_j, x_i)}{\sum_{i=1}^{n} g_h(y_j, x_i)} \tag{3}$$

One advantage provided by this process is that it may converge to a local maximum in relatively few iterations, because the shift is weighted inversely with the probability at the current location. Thus, regions having low density may be passed over quickly, because the denominator of equation (3) may be small. When iterations are close to the local maximum, the reverse may occur.

In a particular embodiment, FAST keypoint detection may not yield robust results due to noisy and/or unstable keypoints. To alleviate this, linear interpolation between frames may be used, and unstable keypoints may be eliminated via thresholding procedures. For example, a region of interest detection procedure may be used. The procedure accepts as input a region of interest box $b_{previous}$ and local maximum location $y_{previous}$ from the previous frame and produces as output an updated region of interest box $b_{current}$ and updated local maximum $y_{current}$. The region of interest box vector b may represent corner locations in the image.

Processing may begin at the current frame by detecting a set of keypoints (e.g., n keypoints) using FAST keypoint detection. Because frames with few keypoints may generate an inaccurate density function, such frames may be eliminated with a keypoints threshold (e.g., $thresh_1$). For frames with sufficient keypoints, the mean-shift algorithm may be used to locate the local maximum $y_{current}$ of the keypoint density function, with respect to a selected kernel and bandwidth. The localization may be initialized from a center of the current frame, based on an assumption that the center is a base point for user attention. After the local maximum is located, linear interpolation in accordance with equation (4) may be used to smooth changes between consecutive frames, where $0 < \beta < 1$ specifies the interpolation amount:

$$y_{candidate} = \beta y_{current} + (1-\beta) y_{previous} \quad (4)$$

If the kernel bandwidth is set (e.g., by user preference) to a large value, the local maxima may correspond to a region that has no nearby keypoints. This may occur in an image that includes two objects separated by a distance and a constant background. Because this type of local maxima does not correspond to a region of interest, it is eliminated by constraining the candidate local maxima such that a likelihood of the closest keypoint with respect to the candidate local maxima is larger than $p_1$, i.e., $\arg\max_i(l_{candidate}(x_i)) \geq p_1$.

Another potential unstable shift may occur when the number of keypoints that are close to the current local maxima is small. This may indicate that the density function is not stable and may lead to jitter. Such a situation may be removed by a condition cardinality($l_{current}(x_i) > p_2$)>$thresh_2$, so that a candidate local maximum is rejected if the number of keypoints with likelihood greater than $p_2$ is not greater than $thresh_2$.

If a candidate local maximum passes these tests, it may be accepted as the current local maximum. The current region of interest box may then be calculated such that it includes all keypoints with likelihood greater than $p_3$, i.e. $l_{current}(x_i) \geq p_3$. Because this region may depend on unstable keypoints, it may include jitter noise. To update the region of interest box invariant to such noise, a linear interpolation is used between the current region of interest box and the previous frame's region of interest box. Then, an amount of change in each side of the candidate box is calculated. If any of the sides changes at least 10% with respect to the previous frame, the candidate box may be accepted. If none of the sides have changed at least 10% with respect to the previous frame, no change may occur.

The above region of interest (ROI) detection procedure may be represented by the following pseudocode:

Input the previous frame ROI box and local maxima $b_{previous}$ and $y_{previous}$
Locate a set of n keypoints X using FAST-type detector
if n≥ thresh1 then
    Starting with image center $y_0$ obtain the local maximum $y_{current}$
    using Equation (3)
    Calculate a candidate center via linear interpolation from previous frame
        $y_{candidate} = \beta y_{current} + (1-\beta) y_{previous}$
    Calculate the likelihood of points with respect to $y_{candidate}$ and $y_{current}$
        $l_{candidate}(x_i) = g_h(x_i, y_{candidate})$
        $l_{current}(x_i) = g_h(x_i, y_{current})$ for i = 1, 2,...,n
    if arg $\max_i(l_{candidate}(x_i)) \geq p_1$ and
    cardinality($l_{current}(x_i) > p_2$) > $thresh_2$ then
        Accept the candidate location
        $y_{current} = y_{candidate}$
        Calculate current ROI box $b_{current}$ including all points with
        $l_{current}(x_i) > p_3$
        Calculate a candidate ROI box via linear interpolation
            $b_{candidate} = \beta b_{current} + (1-\beta) b_{previous}$,
            if side of $b_{candidate}$ at least 10% > than corresponding side of
            $b_{previous}$ then
                $b_{current} = b_{candidate}$
            else
                Do not change the current box (i.e., $b_{current} = b_{current}$)
            end if
            Return $b_{current}$ and $y_{current}$
    else
        No Detection
    end if
else
    No Detection
end if It should be noted that because the above algorithm and pseudocode may involve floating point operations, it may not work with devices configured to perform only integer operations. For such embodiments, the Gaussian kernel calculation may be replaced with an Epanechnikov kernel. That is, $g_h(x, x_i)$ may be replaced with $t_h(x,x_i) = |1-\|x-x_i\|^2/2(h^2)|_+$, where $|x|_+ = x$ if $x > 0$ else $|x|_+ = 0$.

In a particular embodiment, the thresholds $thresh_1 = thresh_2 = 5$. In another particular embodiment, the interpolation amount between consecutive frames $\beta = 0.55$. In another particular embodiment, the likelihood thresholds are set as $p_1 = p_3 = 0.5$ and $p_2 = 0.75$. It should be noted that with the use of an Epanechnikov kernel and $p_3 = 0.5$, the current box size may be calculated to include all points having $l_{current}(x_i) > 0.5$. Because $l_{current}(x_i) = t_h(y_{current}, x_i) > 0.5$, the maximum box size may be calculated using $\|y_{current} - x_i\|^2 < h^2$. Thus, $-h < (y_{current} - x_i) < h$ and the maximum box size is $2h \times 2h$ pixels. In a particular embodiment, the default bandwidth is set to h=75. In another particular embodiment, the bandwidth (and thus maximum region of interest size) is user-specified.

Figure 8:
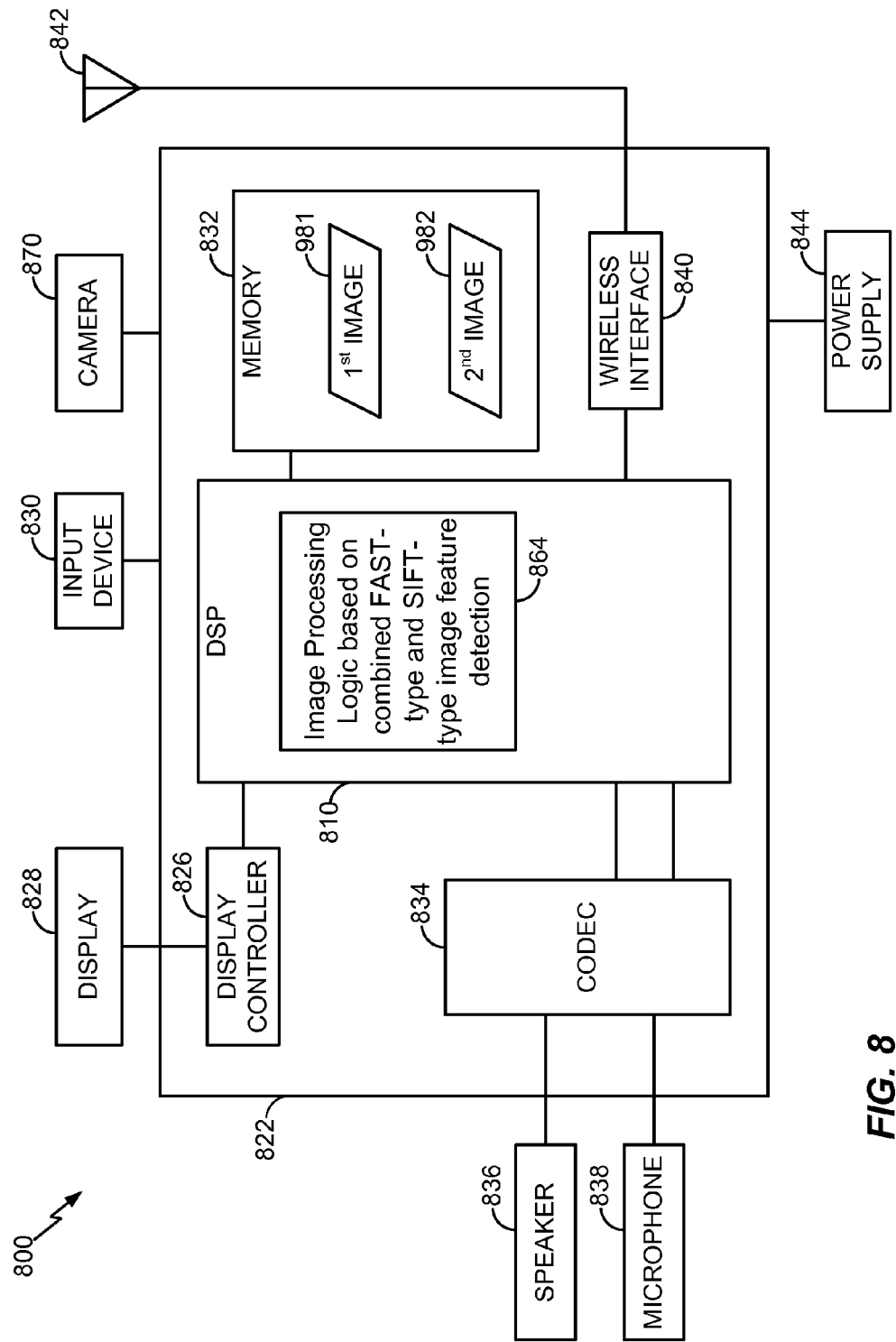
FIG. 8 is a block diagram of a mobile device operable to support the embodiments illustrated in FIGS. 1-7 and FIG. 9.

Referring to FIG. 8, a block diagram of a particular illustrative embodiment of a mobile device is depicted and generally designated 800. The device 800 includes processing means, such as a digital signal processor (DSP) 810, coupled to a memory 832. In an illustrative example, the DSP 810 includes image processing logic 864 configured to indentify image features based on combined application of a first feature detection means (e.g., FAST-type feature detection) and a second feature detection means (e.g., SIFT-type feature detection). In another illustrative example, the memory 832 may store images captured by means for capturing an image (e.g., a camera 870) at the device 810 (e.g., an illustrative first image 881 and an illustrative second image 882). For example, the camera 870 may capture, and the memory 832 may store one or more of the images 110-140 of FIG. 1, the image 210 of FIG. 2, the images 310-330 of FIG. 3, the images 410-420 of FIG. 4, and the images 510-520 of FIG. 5.

FIG. 8 also shows a display controller 826 that is coupled to the digital signal processor 810 and to a means for displaying (e.g., a display 828). A coder/decoder (CODEC) 834 can also be coupled to the digital signal processor 810. A speaker 836 and a microphone 838 can be coupled to the CODEC 834.

FIG. 8 also indicates that a wireless controller 840 can be coupled to the digital signal processor 810 and to a wireless antenna 842. In a particular embodiment, the DSP 810, the display controller 826, the memory 832, the CODEC 834, and the wireless controller 840 are included in a system-in-package or system-on-chip device 822. In a particular embodiment, a means for receiving user input (e.g., an input device 830) and a power supply 844 are coupled to the system-on-chip device 822. In an illustrative example where the device 822 includes a touchscreen, the display 828 and the input device 830 may be at least partially integrated. In a particular embodiment, as illustrated in FIG. 8, the display 828, the input device 830, the speaker 836, the microphone 838, the wireless antenna 842, and the power supply 844 are external to the system-on-chip device 822. However, each of the display 828, the input device 830, the speaker 836, the microphone 838, the wireless antenna 842, and the power supply 844 can be coupled to a component of the system-on-chip device 822, such as an interface or a controller.

Figure 9:
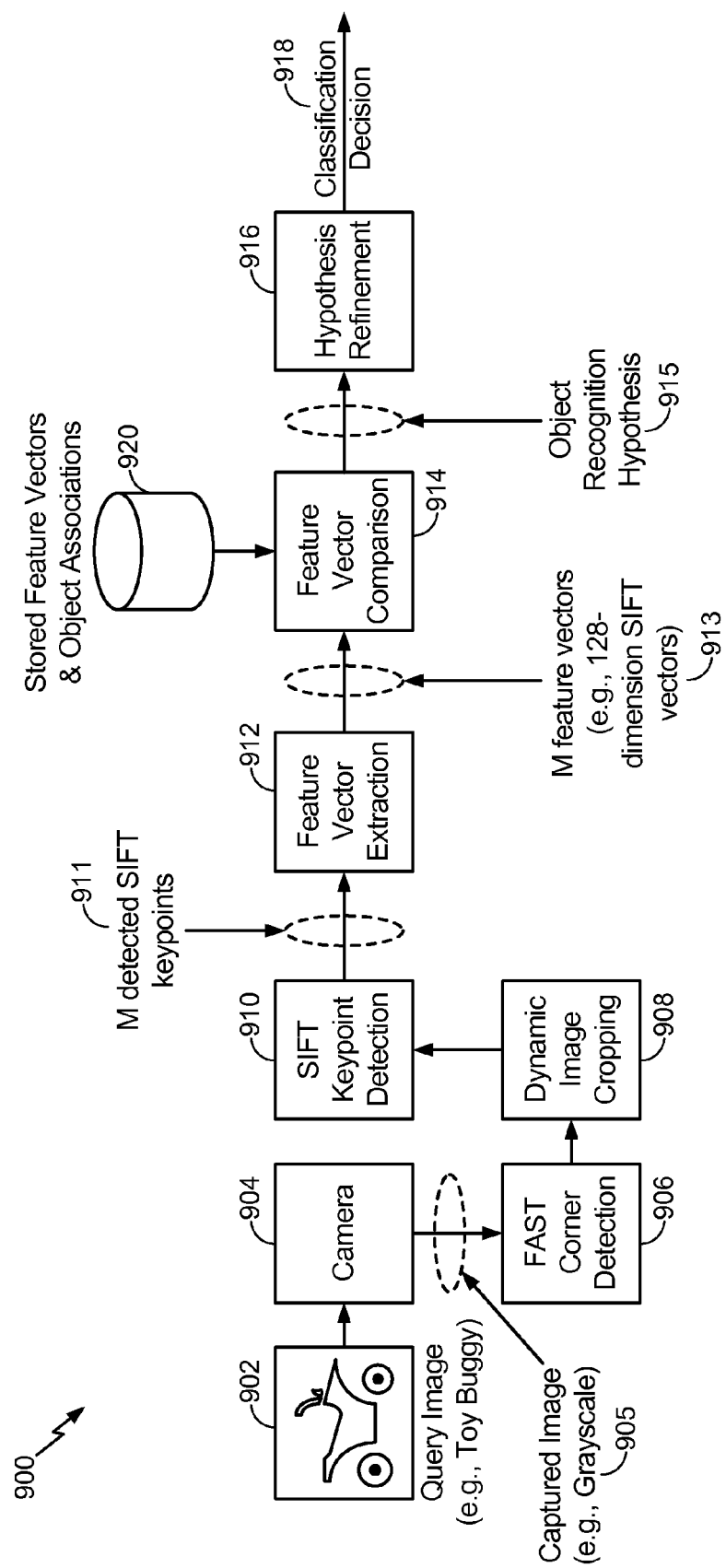
FIG. 9 is a diagram of a particular illustrative embodiment of an object recognition pipeline.

Referring to FIG. 9, a particular illustrative embodiment of an object recognition pipeline is depicted and generally designated 900. The object recognition pipeline 900 may generally be configured to generate a classification decision 918 from a query image 902 based on an application of multiple feature detectors.

The query image 902 may be captured by a camera 904 to generate a captured image 905. In an illustrative embodiment, the camera 904 is the camera 870 of FIG. 8. In a particular embodiment, the captured image 905 is a grayscale image regardless of whether the camera 904 is a grayscale camera or an RGB camera. For example, in the particular embodiment illustrated in FIG. 9, the query image 902 may include a toy buggy and the camera 904 may be part of a mobile phone.

The captured image 905 may be input into a FAST corner detection module 906. The FAST corner detection module 906 may identify FAST keypoints in the captured image 905. For example, the FAST keypoints may be identified using the techniques as described and illustrated with reference to FIGS. 1-7.

The identified FAST keypoints may be used by a dynamic image cropping module 908 to identify and crop a region of interest that includes the identified FAST keypoints. For example, the region of interest may be identified and cropped using the techniques as described and illustrated with reference to FIGS. 1-7.

A SIFT keypoint detection module 910 may detect SIFT keypoints in the cropped region of interest, thereby generating M detected SIFT keypoints 911. For example, M may be an integer between two hundred and four hundred with local scale information $\{(x_i,y_i), \sigma_i\}$ where i=1, 2, . . . M. For example, the M detected SIFT keypoints 911 may be detected as described and illustrated with reference to FIGS. 1-7.

A feature vector extraction module 912 may extract a feature vector for each of the M detected SIFT keypoints 911, thereby generating M feature vectors 913. In a particular embodiment, the feature vector extraction module 912 extracts a particular feature vector for a particular SIFT keypoint based on an image patch surrounding the particular SIFT keypoint. For example, each of the M feature vectors 913 may be SIFT vectors of up to 128 dimensions (e.g., include up to 128 bytes of data).

The M feature vectors 913 may be input into a feature vector comparison module 914. The feature vector comparison module 914 may be configured to compare the M feature vectors 913 with stored feature vectors and object associations 920. The feature vector comparison module 914 may generate an object recognition hypothesis 915 based on the comparison of the M feature vectors 913 with the stored feature vectors and the object associations 920. For example, the object recognition hypothesis 915 may be a "correct" hypothesis that the query image includes a toy buggy or may be an "incorrect" hypothesis that the query image represents a different object.

An optional hypothesis refinement module 916 may modify the object recognition hypothesis 915 when the object recognition hypothesis 915 is incorrect. In a particular embodiment, refining the object recognition hypothesis 915 includes generating one or more refined hypotheses, identifying additional FAST keypoints, detecting additional SIFT keypoints, extracting additional SIFT feature vectors, performing additional comparisons between SIFT feature vectors and the stored feature vectors and object associations 920, or any combination thereof. When the hypothesis is correct (e.g., as verified via user input), a resulting classification decision 918 may be used to query for further information regarding the query image 902. For example, online shopping prices for the toy buggy in the query image 902 may be retrieved based on the classification decision 918.

It will be appreciated that the object recognition pipeline 900 of FIG. 9 may provide object recognition capabilities based on the application of multiple feature detectors. The object recognition pipeline 900 of FIG. 9 may combine accuracy benefits associated with SIFT feature detection with speed benefits of FAST keypoint identification. It should be noted that the SIFT keypoint detection module 910 may be executed while a user points the camera 904 at the query image 902 or "offline" based on analysis of the cropped image produced by the dynamic image cropping module 908.

It will also be appreciated that the object recognition pipeline 900 of FIG. 9 may be executed entirely at a camera-equipped device (e.g., a mobile phone) or in a distributed fashion. For example, in a first embodiment, the camera 904, the modules 906, 908, 910, 912, 914, and 916, and the stored feature vectors and object associations 920 may all be located at a mobile phone. The stored feature vectors and object associations 920 may have a reduced size to conserve memory at the mobile phone. In a second embodiment, only the camera 904 may be located at the mobile phone or at another electronic device. The modules 906, 908, 910, 912, 914, and 916, and the stored feature vectors and object associations 920 may be located at a server. The stored feature vectors and object associations 920 may be larger in the second embodiment than in the first embodiment because of increased available storage space at the server. In a third embodiment, the camera 904 and the FAST/SIFT modules 906, 908, 910, and 912 may be located at the mobile phone, and the comparison/refinement modules 914 and 916 and the stored feature vectors and object associations 920 may be located at the server.

Those of skill would further appreciate that the various illustrative logical blocks, configurations, modules, circuits, and algorithm steps described in connection with the embodiments disclosed herein may be implemented as electronic hardware, computer software, or combinations of both. Various illustrative components, blocks, configurations, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The steps of a method or algorithm described in connection with the embodiments disclosed herein may be embodied directly in hardware, in a software module executed by a processor, or in a combination of the two. A software module may reside in random access memory (RAM), flash memory, read-only memory (ROM), programmable read-only memory (PROM), erasable programmable read-only memory (EPROM), electrically erasable programmable read-only memory (EEPROM), registers, hard disk, a removable disk, a compact disc read-only memory (CD-ROM), or any other form of storage medium known in the art. An exemplary storage medium is coupled to the processor such that the processor can read information from, and write information to, the storage medium. In the alternative, the storage medium may be integral to the processor. The processor and the storage medium may reside in an application-specific integrated circuit (ASIC). The ASIC may reside in a computing device or a user terminal. In the alternative, the processor and the storage medium may reside as discrete components in a computing device or user terminal.

The previous description of the disclosed embodiments is provided to enable any person skilled in the art to make or use the disclosed embodiments. Various modifications to these embodiments will be readily apparent to those skilled in the art, and the principles defined herein may be applied to other embodiments without departing from the scope of the disclosure. Thus, the present disclosure is not intended to be limited to the embodiments shown herein but is to be accorded the widest scope possible consistent with the principles and novel features as defined by the following claims.

What is claimed is:

1. A method, comprising:
    applying a first feature detector to a portion of an image captured by a camera to detect a first set of features;
    locating a region of interest based on the first set of features;
    determining a boundary corresponding to the region of interest;
    displaying the boundary at a display;
    detecting a movement of the camera that translates the image to a second image;
    determining whether to generate a modified boundary in response to the movement, wherein generating the modified boundary comprises performing one or more of a translation operation and a resizing operation on the boundary;
    displaying the modified boundary instead of the displayed boundary if the modified boundary is generated; and
    in response to receiving user input to accept the displayed boundary, applying a second different feature detector to an area of the image encapsulated by the boundary, the second feature detector providing more accurate localization of features than the first feature detector.

2. The method of claim 1, wherein the portion of the image comprises the entire image.

3. The method of claim 1, wherein the image is a frame of a video stream captured by the camera.

4. The method of claim 1, wherein the camera and the display are integrated into a mobile device.

5. The method of claim 4, wherein the first feature detector is a Features from Accelerated Segment Test (FAST)-type feature detector and wherein the first set of features comprises a set of FAST keypoints.

6. The method of claim 1, wherein the second feature detector is a Scale-Invariant Feature Transform (SIFT)-type feature detector.

7. The method of claim 1, wherein the user input further comprises an indication that a desired object is displayed within the boundary.

8. The method of claim 1, wherein the boundary is one of a bounding box, a bounding ellipse, and a bounding circle.

9. The method of claim 8, wherein the region of interest is a region closest to a center of the image having a density of features exceeding an object indication threshold.

10. The method of claim 1, wherein generating the modified boundary comprises:
    applying the first feature detector to the second image to detect a second set of features;
    performing a mean-shift calculation on the second set of features to determine a local maxima of the second image;
    determining a candidate center location of the modified boundary based on a linear interpolation of the second image with respect to the image;
    for each particular feature in the second set of features, determining a likelihood that the particular feature is encapsulated by the modified boundary, wherein the likelihood is determined based on a kernel function; and
    determining the modified boundary such that the modified boundary encapsulates each feature in the second set of features having a likelihood greater than a probability threshold.

11. The method of claim 10, wherein the kernel function is one of a Gaussian kernel function and an Epanechnikov kernel function and wherein a bandwidth of the kernel function indicates a maximum size of the region of interest.

12. The method of claim 11, wherein the bandwidth is user-specified.

13. The method of claim 10, wherein the modified boundary is not displayed when no side of the modified boundary is at least ten percent larger than a corresponding side of the boundary.

14. The method of claim 1, wherein both the boundary and the modified boundary encapsulate the same object of interest.

15. The method of claim 1, wherein the boundary and the modified boundary encapsulate different objects of interest.

16. The method of claim 1, further comprising
    receiving a first user input indicating a first corner of the region of interest, wherein the first set of features is associated with the first corner and wherein the portion of the image comprises the first corner;
    while a movement of the camera translates the image to a second image, tracking the first set of features to locate the first corner in the second image;
    receiving a second user input indicating a second corner of the region of interest in the second image; and
    applying the first feature detector to a portion of the second image comprising the second corner to detect a second set of features, wherein the region of interest is further determined based on the second set of features.

17. The method of claim 16, wherein the second corner is opposite the first corner.

18. A non-transitory computer-readable storage medium comprising instructions, that when executed by a processor, cause the processor to:
    apply a first feature detector to a portion of an image received from a camera to detect a first set of features;
    locate a region of interest based on the first set of features;
    determine a boundary corresponding to the region of interest;
    display the boundary at a display;

detect a movement of the camera that translates the image to a second image;
determine whether to generate a modified boundary in response to the movement, wherein generating the modified boundary comprises performing one or more of a translation operation and a resizing operation on the boundary;
display the modified boundary instead of the displayed boundary if the modified boundary is generated; and
in response to receiving user input to accept the displayed boundary, apply a second different feature detector to an area of the image encapsulated by the boundary, the second feature detector providing more accurate localization of features than the first feature detector.

19. The computer-readable storage medium of claim 18, wherein the first feature detector and the second feature detector each detect features independent of color data.

20. The computer-readable storage medium of claim 18, further comprising instructions, that when executed by the processor, cause the processor to perform one or more of a product identification and an information retrieval based on results of the second feature detector.

21. A circuit configured to:
apply a first feature detector to a portion of an image received from an image capture device;
locate a region of interest based on the first set of features;
determine a boundary corresponding to the region of interest;
display the boundary at a display device;
detect a movement of the camera that translates the image to a second image;
determine whether to generate a modified boundary in response to the movement, wherein generating the modified boundary comprises performing one or more of a translation operation and a resizing operation on the boundary;
display the modified boundary instead of the displayed boundary if the modified boundary is generated; and
in response to receiving user input to accept the displayed boundary, apply a second different feature detector to an area of the image encapsulated by the boundary, the second feature detector providing more accurate localization of features than the first feature detector.

22. The circuit of claim 21, wherein the first feature detector is a Features from Accelerated Segment Test (FAST)-type feature detector and wherein the second feature detector is a Scale-Invariant Feature Transform (SIFT)-type feature detector.

23. A mobile device, comprising:
means for capturing an image;
means for displaying a captured image and a boundary;
means for receiving user input; and
processing means configured to:
apply first feature detection means to a portion of the image to detect a first set of features;
locate a region of interest based on the first set of features;
determine the boundary, wherein the boundary corresponds to the region of interest;
detect that the user input indicates an acceptance of the boundary;
detect a movement of the camera that translates the image to a second image;
determine whether to generate a modified boundary in response to the movement, wherein generating the modified boundary comprises performing one or more of a translation operation and a resizing operation on the boundary;
display the modified boundary if the modified boundary is generated; and
apply second different feature detection means to an area of the image encapsulated by the boundary, the second feature detection means arranged to provide a more accurate localization of features than the first feature detection means.

24. The mobile device of claim 23, wherein the means for receiving comprises one of a touchscreen, a keypad, and a button, and wherein the processing means is further configured to:
detect one or more feature detection keypoints based on the application of the second feature detection means;
generate one or more feature vectors based on the identified one or more feature detection keypoints;
compare the generated one or more feature vectors to a plurality of stored feature vectors associated with a plurality of objects; and
generate an object recognition hypothesis based on the comparison.

25. A system, comprising:
a camera configured to capture an image;
a first feature detection module configured to detect first keypoints in the captured image;
a cropping module configured to:
identify a region of interest in the image based on the detected first keypoints;
detect a movement of the camera that translates the image to a second image;
determine whether to generate a modified boundary in response to the movement, wherein generating the modified boundary comprises performing one or more of a translation operation and a resizing operation on the boundary;
display the modified boundary if the modified boundary is generated;
a second different feature detection module configured to detect second keypoints in the region of interest, the second feature detection module providing more accurate localization of features than the first feature detection module;
a vector extraction module configured to extract feature vectors based on the detected second keypoints; and
a vector comparison module configured to compare the extracted feature vectors with a set of stored feature vectors to generate an object recognition hypothesis.

26. The system of claim 25, wherein the set of stored feature vectors is located remotely from at least one of the camera, the first feature detection module, and the second feature detection module.

27. The system of claim 25, further comprising:
a user input device configured to receive user input indicating whether the object recognition hypothesis is correct with respect to the captured image; and
a hypothesis refinement module configured to modify the object recognition hypothesis when the user input indicates that the object recognition hypothesis is incorrect.

28. The system of claim 27, wherein the object recognition hypothesis identifies a particular object, the system further comprising a communications interface configured to receive information associated with the particular object when the user input indicates that the object recognition hypothesis is correct.

29. The system of claim 25, wherein the first feature detection module is a features from accelerated segment test (FAST)-type feature detection module and wherein the second feature detection module is a scale-invariant feature transform (SIFT)-type feature detection module.

* * * * *